United States Patent
Chaoulov et al.

(10) Patent No.: US 7,009,773 B2
(45) Date of Patent: Mar. 7, 2006

(54) COMPACT MICROLENSLET ARRAYS IMAGER

(75) Inventors: Vesselin I. Chaoulov, Orlando, FL (US); Ricardo F. Martins, Orlando, FL (US); Jannick P. Rolland, Chuluota, FL (US)

(73) Assignee: Research Foundation of the University of Central Florida, Inc., Orlando, FL (US)

( * ) Notice: Subject to any disclaimer, the term of this patent is extended or adjusted under 35 U.S.C. 154(b) by 0 days.

(21) Appl. No.: 10/910,148

(22) Filed: Aug. 3, 2004

(65) Prior Publication Data
US 2005/0007673 A1 Jan. 13, 2005

Related U.S. Application Data

(63) Continuation-in-part of application No. 10/418,623, filed on Apr. 19, 2003, now Pat. No. 6,963,454, and a continuation-in-part of application No. 10/285,855, filed on Nov. 1, 2002, now Pat. No. 6,804,066, which is a continuation-in-part of application No. 10/090,070, filed on Mar. 1, 2002, now Pat. No. 6,731,434.

(60) Provisional application No. 60/492,453, filed on Aug. 4, 2003, provisional application No. 60/292,942, filed on May 23, 2001.

(51) Int. Cl.
G02B 27/10 (2006.01)

(52) U.S. Cl. .................... 359/622; 359/630; 345/8

(58) Field of Classification Search ............... 359/619, 359/621, 622, 626, 630; 349/11; 345/7–9
See application file for complete search history.

(56) References Cited

U.S. PATENT DOCUMENTS

| | | | | |
|---|---|---|---|---|
| 5,561,538 A | * | 10/1996 | Kato et al. | 349/5 |
| 5,621,572 A | * | 4/1997 | Fergason | 359/630 |
| 5,796,522 A | * | 8/1998 | Meyers | 359/626 |
| 5,822,125 A | * | 10/1998 | Meyers | 359/621 |
| 6,310,713 B1 | * | 10/2001 | Doany et al. | 359/247 |
| 6,731,434 B1 | * | 5/2004 | Hua et al. | 359/619 |
| 6,804,066 B1 | * | 10/2004 | Ha et al. | 359/771 |

* cited by examiner

Primary Examiner—Huy Mai
(74) Attorney, Agent, or Firm—Brian S. Steinberger; Law Offices of Brian S. Steinberger, P.A.

(57) ABSTRACT

Extremely compact and light-weight optical systems, apparatus, devices and methods to image miniature displays. Such systems include, for example, head-mounted projection displays (HMPD), head-mounted displays (HMDs), and cameras for special effects, compact microscopes and telescopes as well as applications in which magnification and compactness are design criteria. The invention includes an ultra-compact imaging system based on microlenslet arrays and demonstrates that such a system can achieve an object-to-image distance as low as approximately 1.7 mm. with the usage of commercially available microlenslet arrays. The replacement of bulk macro-optical system by multi-aperture micro-optics is achieved.

10 Claims, 3 Drawing Sheets

COMPACT MICROLENSLET ARRAYS IMAGER

This invention claims the benefit of priority to U.S. Provisional Patent Application No. 60/492,453 filed Aug. 4, 2003, and this application is a Continuation-In-Part of both U.S. patent application Ser. No. 10/285,855 filed Nov. 1, 2002, now U.S. Pat. No. 6,804,066 and U.S. patent application Ser. No. 10/418,623 filed Apr. 19, 2003, now U.S. Pat. No. 6,963,454 which are both a Continuation-In-Part of U.S. patent application Ser. No. 10/090,070 filed Mar. 1, 2002, now U.S. Pat. No. 6,731,434, which claimed the benefit of priority to U.S. provisional application 60/292,942 filed May 23, 2001.

FIELD OF INVENTION

This invention relates to the replacement of a bulk single-aperture macro-optical systems by multi-aperture micro-optical systems, and more particularly to assemblies, systems, apparatus, devices and methods of utilizing arrays of lenses combined with appropriate baffles, so that an ultra-compact imaging system with chosen magnification or demagnification can be achieved.

BACKGROUND AND PRIOR ART

Networked virtual environments allow users at remote locations to use a telecommunication link to coordinate work and social interaction. Teleconferencing systems and virtual environments that use 3D computer graphic displays and digital video recording systems allow remote users to interact with each other, to view virtual work objects such as text, engineering models, medical models, play environments and other forms of digital data, and to view each other's physical environment.

A number of teleconferencing technologies support collaborative virtual environments which allow interaction between individuals in local and remote sites. For example, video-teleconferencing systems use simple video screens and wide screen displays to allow interaction between individuals in local and remote sites. However, wide screen displays are disadvantageous because virtual 3D objects presented on the screen are not blended into the environment of the room of the users. In such an environment, local users cannot have a virtual object between them. This problem applies to representation of remote users as well. The location of the remote participants cannot be anywhere in the room or the space around the user, but is restricted to the screen.

Head-mounted displays (HMDs) have been widely used for 3D visualization tasks such as surgical planning, medical training, or engineering design. The main issues of the conventional eyepiece-based HMD technology include tradeoffs between resolution and field-of-view (FOV), and between compactness and eye clearance, the presence of large distortion for wide FOV designs, the conflict of accommodation and convergence, the occlusion contradiction between virtual and real objects, the challenge of highly precise registration, and often the brightness conflict with bright background illumination. The concept of head-mounted projection displays (HMPDs) is an emerging technology that can be thought to lie on the boundary of conventional HMDs, and projection displays such as the CAVE technology.

After the initial proof of concept using off-the-shelf components, a first-generation custom-designed HMPD prototype was built to investigate perception issues and quantify some of the properties and behaviors of the retro-reflective materials in imaging systems. The projection system of the first-generation prototype was custom designed using a double-Gauss lens structure and built from commercially available components. The total weight of each lens assembly was approximately 50 grams (already a significant reduction compared to using off-the-shelf optics) with mechanical dimensions of 35 mm in length by 43 mm in diameter.

Consequently, there is a need for a HMPD augmented reality display that mitigates the above mentioned disadvantages (in part by an internally mounted projected display that provides visible spectrum images without smears and of reduced weight) and has the capability to display virtual objects and environments, superimposes virtual objects on the "real world" scenes, provides "face-to-face" recording and display, be used in various ambient lighting environments, and corrects for optical distortion, while minimizing weight, computational power and time.

Useful lens assemblies of reduced weight and/or increased field of view (FOV) are taught in co-pending U.S. patent application Ser. No. 10/090,070, filed Mar. 1, 2002, now U.S. Pat. No. 6,731,434, which is incorporated by reference, of common assignee with the instant application. The double-Gauss lens disclosed therein has a FOV of approximately 52 degrees with an effective focal length of approximately 35 mm. Co-pending U.S. patent application Ser. No. 10/418,623, filed Apr. 18, 2003, which is incorporated by reference, of common assignee also with the instant application, discloses a compact lens assembly useful for HMPD systems of miniature display of 0.6" diagonal with a FOV of approximately 42 degrees and an effective focal length of approximately 17 mm.

Lightweight, compactness, enhanced mobility and improved fidelity of the field of view are always of basic importance and/or highly desirable, particularly, for head-mounted devices and for these reasons the quest for useful compact and lightweight continues. A key to novel solutions in compact light weight HMDs is to pre-magnify, within a very compact space, the microdisplay in the HMD before it is further imaged toward the eyes. Such an approach is the subject of the current invention. However, the ultra-compact magnifier is broadly applicable to all imaging applications where such magnification is required. Such applications include, but are not limited to, imaging systems that perform magnified-relaying (i.e. magnification greater than 1), demagnified-relaying (i.e. magnification is less than one), or relaying (i.e. magnification equal to one). Examples of such imaging systems include, but are not limited to, images in scanners, copiers, cameras, microscopes, projection systems, eyepieces, and telescopes,

SUMMARY OF THE INVENTION

The first object of the present invention is to provide an imaging assembly, system, apparatus, device and method of using an imaging system of reduced size utilizing arrays of lenses, for example microlenslet arrays.

The second object of this invention is to allow an increase of the apparent size of the miniature display in the HMD or HMPD, thereby making the system more compact.

The third object of the present invention is to allow for an object to be magnified (i.e. magnification greater than one), demagnified (i.e. magnification less than one) or relayed (i.e.

magnification equal to one) by using a compact magnifying or demagnifying optical system based on baffled arrays of microlenses.

The fourth object of the present invention is to replace single aperture bulk macro-optical system with compact multi-aperture micro-optical system.

The fifth object of the present invention is the use of microlenslet arrays in combination with the appropriate baffles to magnify the miniature display integrated in the HMPD or HMD.

Preferred embodiments of the invention encompasses assemblies, apparatus, systems, devices and methods of a lens useful in a head mounted projection display (HMPD) or equivalently a head-mounted display (HMD) having at least two microlenslet arrays in combination with appropriate baffles to magnify the miniature display.

Further objects and advantages of this invention will be apparent from the following detailed description of the presently preferred embodiments that are illustrated schematically in the accompanying drawings.

DESCRIPTION OF THE PREFERRED EMBODIMENTS

Figure 1:
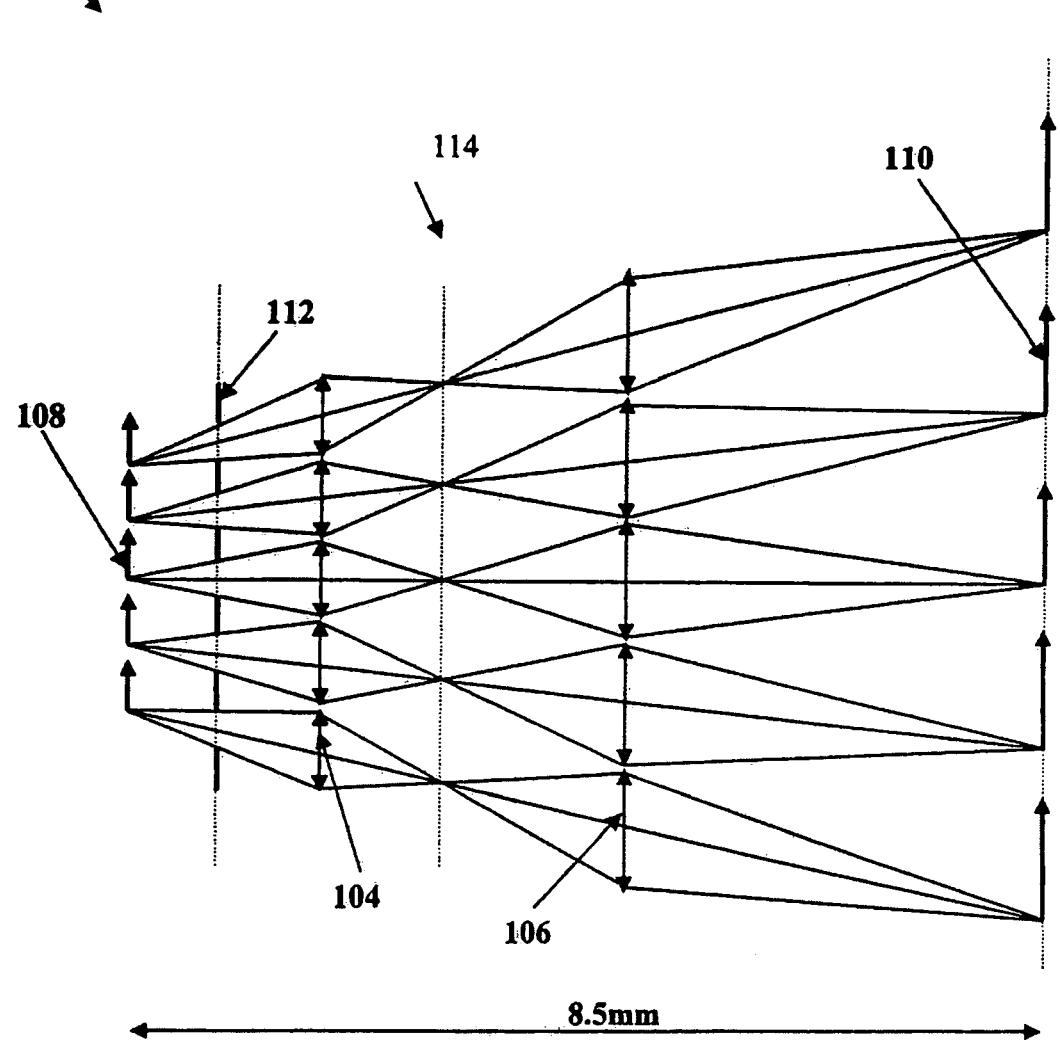
FIG. 1 shows the cross-sectional layout of the novel optical imaging system, subject of this invention.

Before explaining the disclosed embodiments of the present invention in detail, it is to be understood that the invention is not limited in its application to the details of the particular arrangements shown since the invention is capable of other embodiments. Also, the terminology used herein is for the purpose of description and not of limitation.

As previously noted, this invention claims the benefit of priority to U.S. Provisional Patent Application No. 60/492,453 filed Aug. 4, 2004, and this application is a Continuation-In-Part of both U.S. patent application Ser. No. 10/285,855 filed Nov. 1, 2002, now allowed, and U.S. patent application Ser. No. 10/418,623 filed Apr. 19, 2003 which are both a Continuation-In-Part of U.S. patent application Ser. No. 10/090,070 filed Mar. 1, 2002, now U.S. Pat. No. 6,731,434, which claimed the benefit of priority to U.S. provisional application 60/292,942 filed May 23, 2001, all of which are incorporated by reference in the subject invention.

It would be useful to discuss the meanings of some words used herein and their applications before discussing the compact lens assembly of the invention including:

HMPD—head-mounted projection display.

HMD—head-mounted display

Microlens (also called microlenslet)—miniature lenses of diameter from a few microns (e.g. approximately 15 microns) to hundreds of microns (e.g. approximately 500 microns), and of focal length fractions of millimeters (e.g. approximately 0.016 mm) to a few millimeters (e.g. approximately 5 mm). It is to be understood that utilizing arrays of microlenses is not a limitation of the current invention, since the invention can utilize arrays of lenses of any sizes. However, utilizing arrays of microlenses is part of the preferred embodiment since it leads to more compact HMPD and HMD systems.

EFL—effective focal length;

$F^{\#}$—f-number;

OAL—overall length;

FOV—field of view (given in degrees for the diagonal of the display).

Microlens(or microlenslet) arrays, as defined above, can be arrays of refractive microlenses, fabricated by various commercially available technologies, such as the gray-scale technology used by MEMS Optical Inc. or those developed by Adaptive Optics Inc. for example. Usually many microlenslet arrays can be replicated from a single master. Some companies such as MEMS Optical can design and fabricate refractive, diffractive, anamorphic, spherical, and aspherical positive and negative microlenses.

A typical microlens array has nearly diffraction limited performance, high internal transmittance, various lenslet and array geometry, high fill factor and low manufacturing cost, once the master is fabricated. Commonly, microlens arrays can be made of compression molded plastic or epoxy replicated on standard glass window of various thickness. If glass substrate is used, broadband anti-reflection coating is provided on the glass side of the window. Often the customer supplies their own glass substrate as well. The most common geometries of the lenslets are circular, square, and hexagonal and the most common geometry of the array itself is square. The aperture of each lenslet can be as small as approximately 15 microns or less, and the focal length can be as short as approximately 30 microns or less. Microlens arrays containing lenslets of various apertures and focal lengths are commercially designed and fabricated.

Micro-baffles can be sets of transparent holes designed and fabricated on opaque screen. Such micro-baffles can be commercially fabricated by various technologies, such as etching holes on a silicon substrate or masking out holes in glass slide with a chromed surface, for example.

The alignment and packaging of systems containing microlenslet arrays and micro-baffles is usually completed by the company that designs and fabricates the individual components. Various approaches including laser alignment are used.

Further discussion of microlenslet arrays can be found in V. Shaoulov and J. Rolland, "Compact Relay Lenses Using Microlenslet Arrays", Proceedings of the SPIE: International Optical Design Conference 2002, Editors P. K. Manhart and J. M. Sasian, pp 74–79; V. Shaoulov and J. Rolland, "Design and assessment of Microlenslet array relay Optics", Applied Optics 42(34), 6838–6845, (December 2003); and V. Shaoulov, R. Martins, and J. P. Rolland, "Compact microlenslet array-based magnifier", Optics Letters 29(7), 1–3 (April 2004), for example.

Referring to FIG. 1, which shows, in cross-section, the compact imaging system 102 according to the instant invention, which as seen can consist of two dissimilar microlenslet arrays, a first microlens array 104 and a second microlens array 106, which in combination are used to magnify the object 108 into the image 110. The compact imaging system 102 has an opaque glass baffle 112 of circular shape, with dimension of approximately 45 microns diameter, interposed at the appropriate location between the object 108 and the first microlenslet array 104 [Shaoulov, Martins, Rolland, 2004]. The first microlenslet array 104 has a focal length of approximately 500 microns and the diameter of each lenslet is approximately 100 microns. The second microlenslet array 106 has a focal length of approximately 1000 microns and the diameter of each lenslet is approximately 120 microns. The compact imaging system 102 is capable of providing a magnification factor of approximately 2 in the image 110 with an overall object to image length of approximately 9 mm for a weight of approximately 1 gram.

In the compact microlenslet array imager, the first microlenslet array assembly 104, can be located in front of the object 108, and can be used to form an intermediary image in an intermediary image plane 114. The final image 110 can be formed by the second microlenslet array assembly 106. The baffle 112, can be placed between the object 108 and the first microlenslet array assembly 104, and can consist of a set of micro-baffles with computed diameter of, for example, approximately 40 microns, and is used to limit the optical paths through the system and thus suppresses the formation of undesired secondary images (also referred to in the optics literature as ghost images). Each microlenslet array assembly 104, 106 can be made of multiple arrays. Each array within an assembly can be made of optical materials such as, but not restricted to, spherical lenses, aspherical lenses, lenses of multiple glasses, plastic lenses of various plastic materials, gradient index lenses, and liquid crystal lenses.

Figure 2:
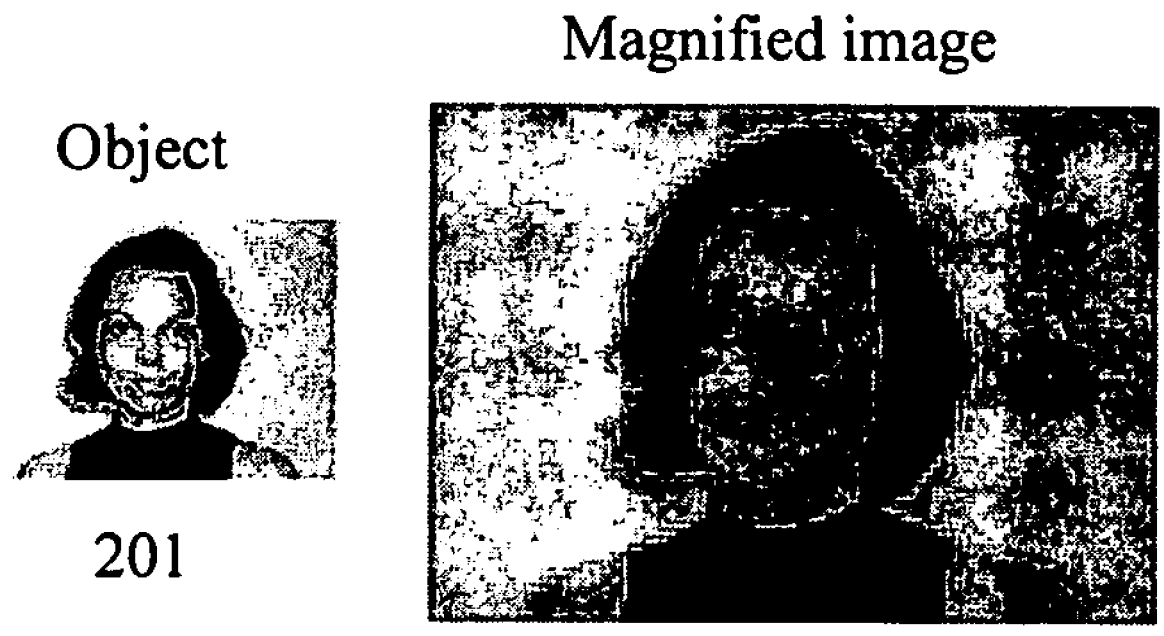
FIG. 2 shows the object and the magnified image, produced by the novel optical system presented in FIG. 1.

Referring now to FIG. 2, the first picture 201 shows the object to be imaged and the second picture 202 shows the magnified image after the compact imaging system 102.

Figure 3:
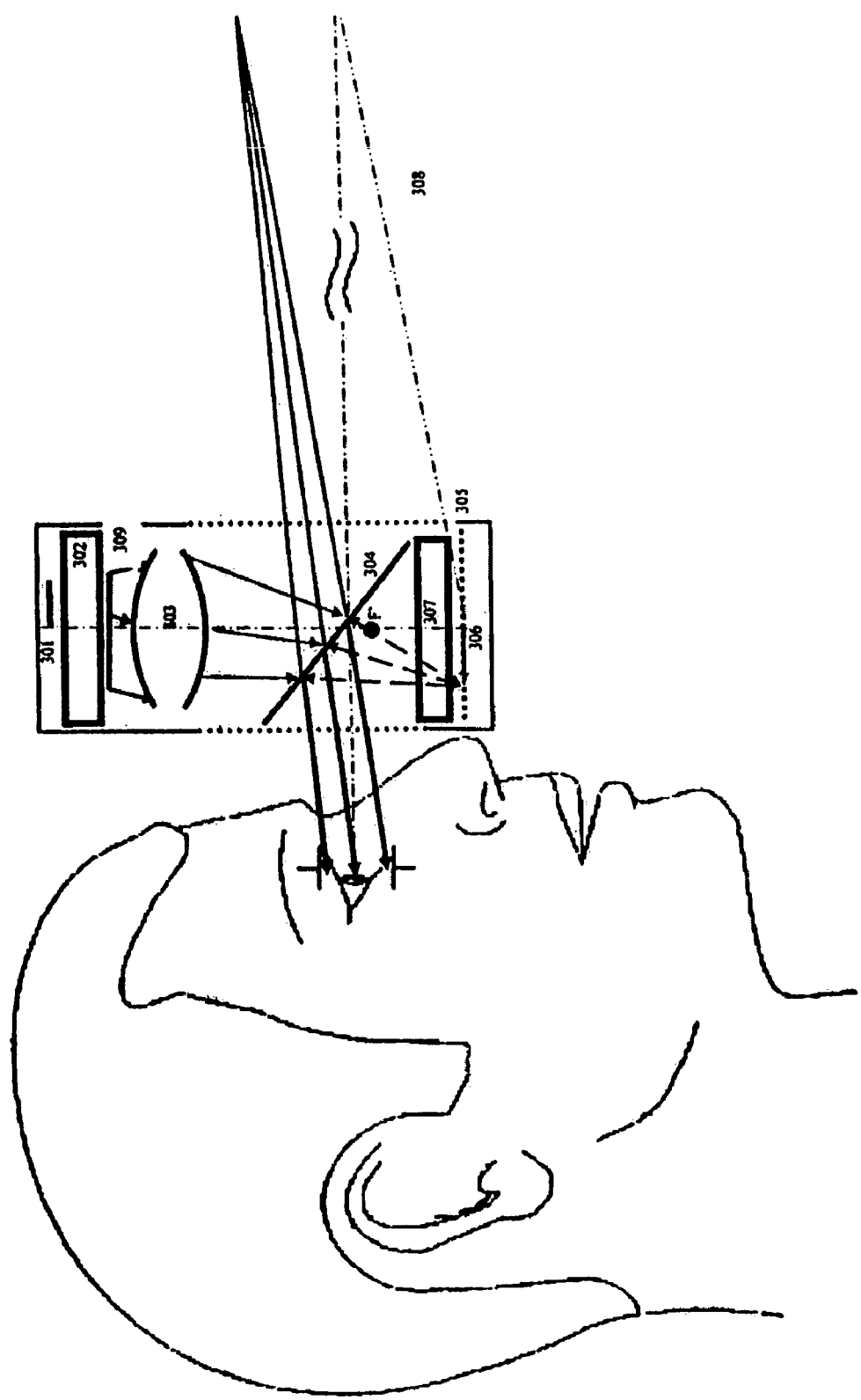
FIG. 3 shows the novel magnifying lens layout used in within an HMPD or HMD to magnify the miniature display integrated in an HMPD or HMD.

FIG. 3 shows the microlenslet array based imager 302, integrated within the concept of HMPD or equivalently HMD, used to magnify the miniature display 301. A miniature display 301 is used to display computer-generated image. The magnified image 309 is then projected by the projection lens 303 toward the beam splitter 304. The image 306 is formed on the retro-reflective screen 305 and further magnified by a second compact lens, such as a single microlenslet array or a Fresnel lens based imager 307. A final virtual image 308 can be formed in front of the viewer's eye.

When the retro-reflective screen 305 is at either the focal plane or within the focal plane of the second microlenslet array based imager 307, or other imager 307 such as Fresnel lenses, the retro-reflective screen 305 reflects rays at the same angle and in the reverse direction traveling towards the beam splitter 304 forming the final image 308 viewed by the user's eye.

As noted above, other useful lens assemblies are taught in co-pending U.S. patent application Ser. No. 10/090,070, filed Mar. 1, 2002, now U.S. Pat. No. 6,731,434, of common assignee with the instant application and fully incorporated herein by reference thereto. The double-Gauss lens disclosed therein has a FOV of approximately 52 degrees with an effective focal length of 35 mm. Co-pending U.S. patent application Ser. No. 10/285,855, filed Nov. 1, 2002 of common assignee also with the instant application and fully incorporated herein by reference thereto, discloses a double-Gauss lens that has a FOV of approximately 70 degrees with an effective focal length of approximately 25.8 mm. Co-pending U.S. patent application Ser. No. 10/418,623, filed Apr. 18, 2003, of common assignee also with the instant application and fully incorporated herein by reference thereto, discloses a compact lens assembly useful for HMPD systems of miniature display of 0.6" diagonal with a FOV of approximately 42 degrees and an effective focal length of approximately 17 mm.

While the original U.S. Pat. No. 6,731,434 implemented an approximately 52 degree FOV with an approximately 1.3" miniature display for use inside the HMPD, the latter application Ser. No. 10/418,623 expanded the optical design to a miniature display of approximately 0.5" with a FOV of approximately 42 degrees. The compact imaging system of the current invention markedly reduces the size and the weight of the optics used in HMPD and HMD systems and provides an increase in the FOV of the latter application Ser. No. 10/418,623 by increasing the miniature display size via the microlenslet array based imager before it is projected with the projection optics.

The evaluation of the microlenslet array-based projective lens shown in FIG. 1, indicates a magnification of the miniature display by a factor of approximately 2 and indicates overall object to image length of approximately 9 mm (one eleventh the length of a conventional magnifying lens) and a weight of less than approximately 1 gram (one seven-hundreth the weight of a conventional lens.

The HMPD can be based on novel innovative technology when one uses the compact lens of the earlier described inventions and now the remarkable novel microlenslets array of this invention for 3D visualization.

The foregoing discussion of the HMPD of the invention has increased FOV, reduced weight, remarkable mobility, and as a major component of a teleportal augmented reality system by using the combination of a plurality of baffled microlenslet arrays for generating a new generation of HMPDs into which has been placed the teleportal system. U.S. patent application Ser. No. 2002/0080094, filed Dec. 22, 2000 of common co-assignee with the instant application, discloses a teleportal augmented reality system that allows 3D visualization with a HMPD and real-time stereoscopic face capture that can be teleported via the network to a remote location for face-to-face collaboration.

A purpose of this invention is to replace single aperture bulk macro-optical system with compact multi-aperture micro-optical system. A key component of the invention is the use of microlenslet arrays in combination with the appropriate baffles to magnify the miniature display integrated in the HMPD or HMD to make this revolutionary technology work.

Other applications of the compact imaging system subject of the invention are as a component of wearable computers, within telescopes and microscopes, and many others.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A compact optical assembly useful for head mounted projection display (HMPD) or head-mounted displays (HMDs) comprising:

(a) a first baffled microlenslet array and a second cooperating microlenslet array which provide an optical means for magnifying images written on a microdisplay within the HMPD or the HMD before imaging to the users' eye (b) miniature projection optics for further magnifying the images in HMPD or an eyepiece optics for further magnifying the images in HMD; and (c) retro-reflective means for receiving said magnified images by disposing them on a micro-structures retro-reflective screen integrated on the interior surface of said HMPD or said HMD and within the field of view of said miniature projection optics or said eyepiece optics; and wherein both of said miniature projection optics or said eyepiece optics and said retro-reflective means are located internally of the external housing of said HMPD or HMD assembly, respectively.

2. The assembly of claim 1, wherein a baffle is located between the second array and the image plane.

3. The assembly of claim 1, wherein a baffle is located between an object and the first microlens array and wherein another baffle is located between the second microlens array and the image plane.

4. The assembly of claim 1, where the microlenslet arrays are aspherical shaped.

5. The assembly of claim 1 wherein the first baffled microlenslet arrays comprises:

multiple arrays.

6. The assembly of claim 1 wherein the second microlenslet array comprises:

multiple arrays.

7. A method of forming a head mounted display (HMD) or head mounted projection display (HMPD) having a compact lens display assembly comprising the steps of:
  (a) combining a baffle with a first microlenslet array; and
  (b) combining said combined baffle and first microlenslet array with a second microlenslet array;
  (c) providing images of an object to be viewed by a user wearing the HMD or (HMPD) incorporating the compact lens display assembly with said combined baffle and said first microlenslet array and said second microlenslet array.
  (d) further magnifying the images with a miniature projection optics in the HMPD or an eyepiece optics in the HMD; and
  (e) disposing the magnified images on a retro-reflective screen, wherein said miniature projection optics or eyepiece optics are integrated on an interior of said HMPD or HMD.

8. The method described in claim 7, further comprising the step of:

combining said the baffle with the second microlenslet array.

9. The method described in claim 7, further comprising the step of:

combining said baffles with the first and the second microlenslet array.

10. The method of claim 7, further comprising the step of:

providing a distance between the object and the image as low as approximately 1.7 mm.

* * * * *

UNITED STATES PATENT AND TRADEMARK OFFICE
CERTIFICATE OF CORRECTION

| | | |
|---|---|---|
| PATENT NO. | : 7,009,773 B2 | Page 1 of 1 |
| APPLICATION NO. | : 10/910148 | |
| DATED | : March 7, 2006 | |
| INVENTOR(S) | : Vesselin I. Chaoulov | |

It is certified that error appears in the above-identified patent and that said Letters Patent is hereby corrected as shown below:

Col. 1, lines 13-14 should read as follows:

STATEMENT REGARDING FEDERALLY SPONSORED RESEARCH OR DEVELOPMENT

This invention was funded in part by STRICOM (via NAWC), federal contract number N6133902C0082.

Signed and Sealed this
First Day of March, 2011

David J. Kappos
*Director of the United States Patent and Trademark Office*